United States Patent
Chinthalapudi et al.

(10) Patent No.: US 12,515,709 B2
(45) Date of Patent: Jan. 6, 2026

(54) INTELLIGENT VEHICLE SYSTEMS AND CONTROL LOGIC FOR MITIGATING SENSOR LIMITATIONS ON MIXED GRADIENT PATHS

(71) Applicant: GM GLOBAL TECHNOLOGY OPERATIONS LLC, Detroit, MI (US)

(72) Inventors: Siva Chinthalapudi, Novi, MI (US); Carlo LoChirco, Shelby Township, MI (US); Dmitriy Feldman, West Bloomfield, MI (US); Amanpal S. Grewal, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 230 days.

(21) Appl. No.: 18/391,843

(22) Filed: Dec. 21, 2023

(65) Prior Publication Data
US 2025/0206348 A1     Jun. 26, 2025

(51) Int. Cl.
*B60W 60/00*     (2020.01)

(52) U.S. Cl.
CPC ... *B60W 60/0018* (2020.02); *B60W 2420/408* (2024.01); *B60W 2552/00* (2020.02); *B60W 2554/80* (2020.02)

(58) Field of Classification Search
CPC ......... B60W 60/0018; B60W 2552/00; B60W 2554/80; B60W 2420/408
USPC ........................................................ 701/23
See application file for complete search history.

(56) References Cited

U.S. PATENT DOCUMENTS

| | | | |
|---|---|---|---|
| 7,245,231 B2 | 7/2007 | Kiefer | |
| 7,650,217 B2 * | 1/2010 | Ueyama | B60W 30/16 701/96 |
| 10,248,129 B2 | 4/2019 | Reed | |
| 10,331,141 B2 | 6/2019 | Grimm | |
| 10,430,641 B2 | 10/2019 | Gao | |
| 11,691,566 B2 | 7/2023 | Slutsky | |
| 11,748,936 B2 | 9/2023 | Slutsky | |

(Continued)

FOREIGN PATENT DOCUMENTS

| | | |
|---|---|---|
| DE | 19543402 A1 | 5/1997 |
| DE | 102011083610 A1 | 3/2013 |

*Primary Examiner* — Hunter B Lonsberry
*Assistant Examiner* — Helen Li
(74) *Attorney, Agent, or Firm* — Quinn IP Law

(57) ABSTRACT

Presented are intelligent vehicle systems providing AV/ADAS driving features with enhanced on-vehicle sensor operation for mixed-gradient pathways, methods for making/using such systems, and vehicles equipped with such systems. A method of operating a host vehicle includes a vehicle controller receiving gradient data indicating the host vehicle is traversing a mixed-gradient pathway. After receiving the gradient data, first and second on-vehicle sensors detect a target vehicle forward of the host vehicle on the mixed-gradient pathway. After detecting the target, the vehicle controller determines whether or not both sensors dropped the target vehicle. Responsive to the target vehicle being dropped, the vehicle controller determines if the target vehicle is reacquired by only the first sensor and not the second sensor. If so, the vehicle controller responsively transmits one or more command signals to one or more resident subsystems of the host vehicle to suppress an automated driving operation of the host vehicle.

20 Claims, 3 Drawing Sheets

(56) References Cited

U.S. PATENT DOCUMENTS

| | | | |
|---|---|---|---|
| 2012/0166058 A1* | 6/2012 | Armbrust | B60W 30/17 |
| | | | 701/1 |
| 2015/0291160 A1* | 10/2015 | Kim | B60W 30/16 |
| | | | 345/633 |
| 2016/0070000 A1* | 3/2016 | Takasuka | G01S 17/931 |
| | | | 356/5.01 |
| 2016/0207533 A1* | 7/2016 | Uechi | B60W 30/09 |
| 2017/0355369 A1* | 12/2017 | La | B60W 30/143 |
| 2021/0237594 A1 | 8/2021 | Prasad | |
| 2021/0237716 A1 | 8/2021 | Prasad | |
| 2022/0281456 A1* | 9/2022 | Giovanardi | G06V 20/58 |
| 2022/0292289 A1 | 9/2022 | Shalumov | |

\* cited by examiner

INTELLIGENT VEHICLE SYSTEMS AND CONTROL LOGIC FOR MITIGATING SENSOR LIMITATIONS ON MIXED GRADIENT PATHS

INTRODUCTION

The present disclosure relates generally to intelligent control systems of motor vehicles. More specifically, aspects of this disclosure relate to advanced driver assistance systems with adaptive vehicle driving capabilities using sensor-based object targeting.

Current production motor vehicles, such as the modern-day automobile, may be equipped with a network of onboard electronic devices that provide automated driving capabilities to help minimize driver effort. For automotive applications, one of the most recognizable types of automated driving features is the cruise control system, which allows a vehicle operator to set a desired vehicle speed and have the onboard vehicle computer system maintain that speed without the driver operating the accelerator or brake pedals. Next-generation Adaptive Cruise Control (ACC), in addition to regulating vehicle speed, concomitantly manages headway spacing between the host vehicle and a leading "target" vehicle. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering Systems, Electronic Stability Control (ESC) systems, and other Advanced Driver Assistance Systems (ADAS) are also available on many modern-day automobiles.

Automated and autonomous vehicle (AV) systems may employ an assortment of on-vehicle sensing components to provide target object detection, tracking, and ranging. For instance, radio detection and ranging (RADAR) systems detect the presence of, distance to, and/or speed of a target object by discharging pulses of high-frequency electromagnetic waves that are reflected off the object back to a suitable radio receiver. As another option, a vehicle may employ a light detection and ranging (LIDAR) backscatter system that emits and detects pulsed laser beams to determine distances to stationary or moving targets using assorted forms of light energy, including invisible, infrared light spectrums, and near-infrared light spectrums. A vehicle-mounted sensor farm with assorted digital cameras, ultrasonic sensors, etc., also provides real-time target data. Historically, these object detection and ranging systems may be limited in accuracy and application due to fluctuating gradients in the roadway topography and innate system limitations due to constraints on available packaging locations and total sensor count.

SUMMARY

Presented below are intelligent vehicle systems with control logic that provision AV/ADAS driving features with enhanced on-vehicle sensor operation for mixed-gradient pathways, methods for manufacturing and methods for operating such systems, and motor vehicles equipped with such systems. By way of illustration, and not limitation, a closed-loop vehicle control algorithm helps to mitigate sensor limitations on hilly roads by detecting large variations in road gradient (e.g., >10-degree grade) and, when detected, compensating for delays between camera acquisition of a closest-in-path vehicle (CIPV) and subsequent detection of the CIPV target by a front long-range radar (LRR) package. Monocular camera systems used for AV/ADAS features, for example, often operate on a default assumption of a flat roadway throughout its field of view. Consequently, the vehicle's AV/ADAS control system may need to actively adapt any attendant driving features when the host (ego) vehicle is traversing across a mixed-gradient path (e.g., hilly road, winding mountain pass, inclined street, etc.). For instance, the AV/ADAS control system aggregates sensor data output by a resident inertial measurement unit (IMU) to recognize when the host vehicle is cresting a hilly roadway. As the host vehicle crests, the front camera module (FCM)—mounted to the vehicle roof—will reacquire a previously dropped CIPV target before the LRR package—mounted to the vehicle front end—senses the CIPV target. Upon detecting this delay, the AV/ADAS control system responsively dampens the system response to the detected, dropped, then reacquired CIPV target (e.g., suppresses ACC/CAS braking) to militate against a false-positive system response (e.g., collision imminent braking (CIB)).

Aspects of this disclosure are directed to intelligent vehicle control systems, memory-stored control protocols, and system control logic for provisioning AV/ADAS driving features with enhanced on-vehicle sensor operation for mixed-gradient pathways. In an example, a method is presented for operating a host vehicle that is equipped with first and second forward-facing, on-vehicle sensors that are each mounted at a respective location of the vehicle body. This representative method includes, in any order and in any combination with any of the above and below disclosed options and features: receiving, e.g., via a resident or remote microcontroller, control module, integrated circuit (IC) device, or network of controllers/modules/devices (collectively "controller") of the host vehicle, gradient data indicating the host vehicle is traversing a mixed-gradient pathway; detecting, e.g., via both of the host vehicle's forward-facing sensors after receipt of the gradient data, a target vehicle forward of the host vehicle on the mixed-gradient pathway; determining, e.g., via the vehicle controller after initial detection of the target vehicle, if both forward-facing sensors subsequently dropped the target vehicle (e.g., new sensor data indicates target is no longer detected); determining, e.g., via the vehicle controller responsive to confirming the target vehicle was dropped by both sensors, if the target vehicle is initially reacquired by only the first sensor and not the second sensor; and transmitting, e.g., via the vehicle controller responsive to confirming the target vehicle is initially reacquired by only the first sensor, one or more command signals to one or more resident subsystems of the host vehicle to suppress an automated driving operation of the host vehicle (e.g., constrain CAS-activated CIB and auto steer).

Aspects of this disclosure are also directed to computer-readable media (CRM) containing controller-executable instructions for mitigating vehicle sensor limitations on hilly roads. In an example, a non-transient CRM stores instructions that are executable by one or more processors of a vehicle controller of a host vehicle. The host vehicle is equipped with first and second forward-facing sensors that are mounted at first and second locations, respectively, of the vehicle body. The CRM-stored instructions, when executed by the processor(s), cause the vehicle controller to perform operations, including: receiving gradient data indicating the host vehicle is traversing a mixed-gradient pathway; determining, responsive to receiving the gradient data, both the first and second sensors detect a target vehicle forward of the host vehicle on the mixed-gradient pathway; determining, after detection of the target vehicle by the first and second sensors, if both the first and second sensors dropped the target vehicle; determining, responsive to the target vehicle being dropped by the first and second sensors, if the target vehicle is reacquired by the first sensor and not the second sensor; and transmitting, responsive to determining the target vehicle is reacquired by the first sensor and not the second sensor, a command signal to a resident subsystem of the host vehicle to suppress an automated driving operation of the host vehicle.

Additional aspects of this disclosure are directed to motor vehicles equipped with intelligent control systems that provision AV/ADAS driving features with enhanced on-vehicle sensor operation for mixed-gradient pathways. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, such as an electric traction motor and/or an internal combustion engine assembly, drives one or more of the road wheels to thereby propel the vehicle. Also mounted to the vehicle body is a resident network of sensing devices, which includes an array of cameras, RADAR scanners, LIDAR packages, close-range infrared sensors, ultrasonic proximity sensors, etc., mounted at discrete locations on the vehicle body.

Continuing with the discussion of the above example, the motor vehicle also includes a vehicle controller that is programmed to receive gradient data, e.g., from a resident multi-axis IMU or GPS transceiver, that indicates the motor vehicle is traversing a mixed-gradient pathway and, responsive to receiving the gradient data, confirm that two of the forward-facing, on-vehicle sensors simultaneously detect a target vehicle forward of the motor vehicle on the mixed-gradient pathway. After sensor-fused detection of the target vehicle, the vehicle controller determines whether or not both sensors have subsequently dropped the target vehicle (e.g., lost over the crest of a hill); if so, the vehicle controller determines if the target vehicle is initially reacquired by only the first sensor and not the second sensor. Upon confirming that the target vehicle was initially reacquired by only the first sensor, the vehicle controller responsively commands at least one resident subsystem to suppress at least one automated driving operation of the motor vehicle. The resident subsystem may include, for example, the host vehicle's brake system and/or steering system, and the automated driving operation may include an AV/ADAS-automated braking operation and/or steering operation.

For any of the disclosed vehicles, methods, and CRM, the vehicle controller may respond to determining the target vehicle was dropped by determining a drop position at which the target vehicle was dropped by the first and second sensors. In this instance, the vehicle controller may also determine an estimated travel time for the host vehicle to reach this drop position, e.g., at the host vehicle's ACC-set vehicle speed. Moreover, the vehicle controller may command the host vehicle's powertrain control module (PCM) to maintain or to slowly ramp up/down to a current (e.g., ACC set) vehicle speed for at least the estimated time. Normal powertrain control may be resumed after the vehicle reaches the drop position of the target vehicle. As a further option, a determination that the target vehicle was reacquired by the only first sensor may include the vehicle controller confirming, from sensor data output by the sensor(s), the host vehicle is concurrently traversing the mixed-gradient pathway when the target vehicle is reacquired.

For any of the disclosed vehicles, methods, and CRM, the vehicle controller may respond to confirming the target vehicle is initially reacquired by only the first sensor by determining if the target vehicle is at least a predefined minimum distance forward of the host vehicle when reacquired. In this instance, the vehicle controller transmits the command signal to the resident subsystem to suppress the automated driving operation further in response to determining the target vehicle is at least the predefined minimum distance forward of the host vehicle. Moreover, the vehicle controller may respond to determining the target vehicle is not at least the predefined minimum distance forward of the host vehicle by commanding the host vehicle's brake system to immediately execute a braking operation (e.g., immediately activate CIB).

For any of the disclosed vehicles, methods, and CRM, the vehicle controller may be programmed to not command the resident subsystem to suppress the automated driving operation in response to determining the target vehicle was reacquired substantially coincident by both the first and second sensors. If both forward-facing sensors subsequently reacquire the dropped target at substantially the same time, the AV/ADAS system is not expected to erroneously activate CIB or other false-positive system response. In at least some applications, determining the target vehicle is dropped by both of the forward-facing sensors may include the vehicle controller confirming neither the host vehicle nor the target vehicle has changed lanes substantially coincident with the target vehicle being dropped by the sensors. Confirming the target vehicle is dropped may also include the vehicle controller confirming there has not been a significant change in the dynamic characteristics of the host vehicle within a vehicle-calibrated range.

For any of the disclosed vehicles, methods, and CRM, the command signal may cause the resident subsystem to suppress the automated driving operation: (1) for at least a vehicle-calibrated suppression timeframe; (2) until the second sensor reacquires the target vehicle after the first sensor initially reacquired the target vehicle; and/or (3) until the vehicle controller determines the target vehicle is not at least a predefined minimum distance forward of the host vehicle (e.g., at least about 50 meters (m)). As another option, detecting the target vehicle forward of the host vehicle may include the vehicle controller confirming the target vehicle is a closest-in-path vehicle and is in the same lane as the host vehicle. As yet a further option, the gradient data may be in the form of real-time sensor data that is generated by a multi-axis IMU, which is mounted to the vehicle body and contains one or more gyroscopes and one or more accelerometers. For at least some desired implementations, the first sensor may be a digital video camera that is mounted at a first height on the vehicle body (e.g., to the passenger compartment roof structure), and the second sensor may be a long-range radar array that is mounted at a second height, lower than the first height, on the vehicle body (e.g., behind the front grill). As indicated above, the mixed-gradient pathway may be a hilly road or other markedly inclined pathway (e.g., at least 10-25° gradient), and the gradient data may indicate the host vehicle is ascending towards and/or about to reach the crest of the hilly road.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
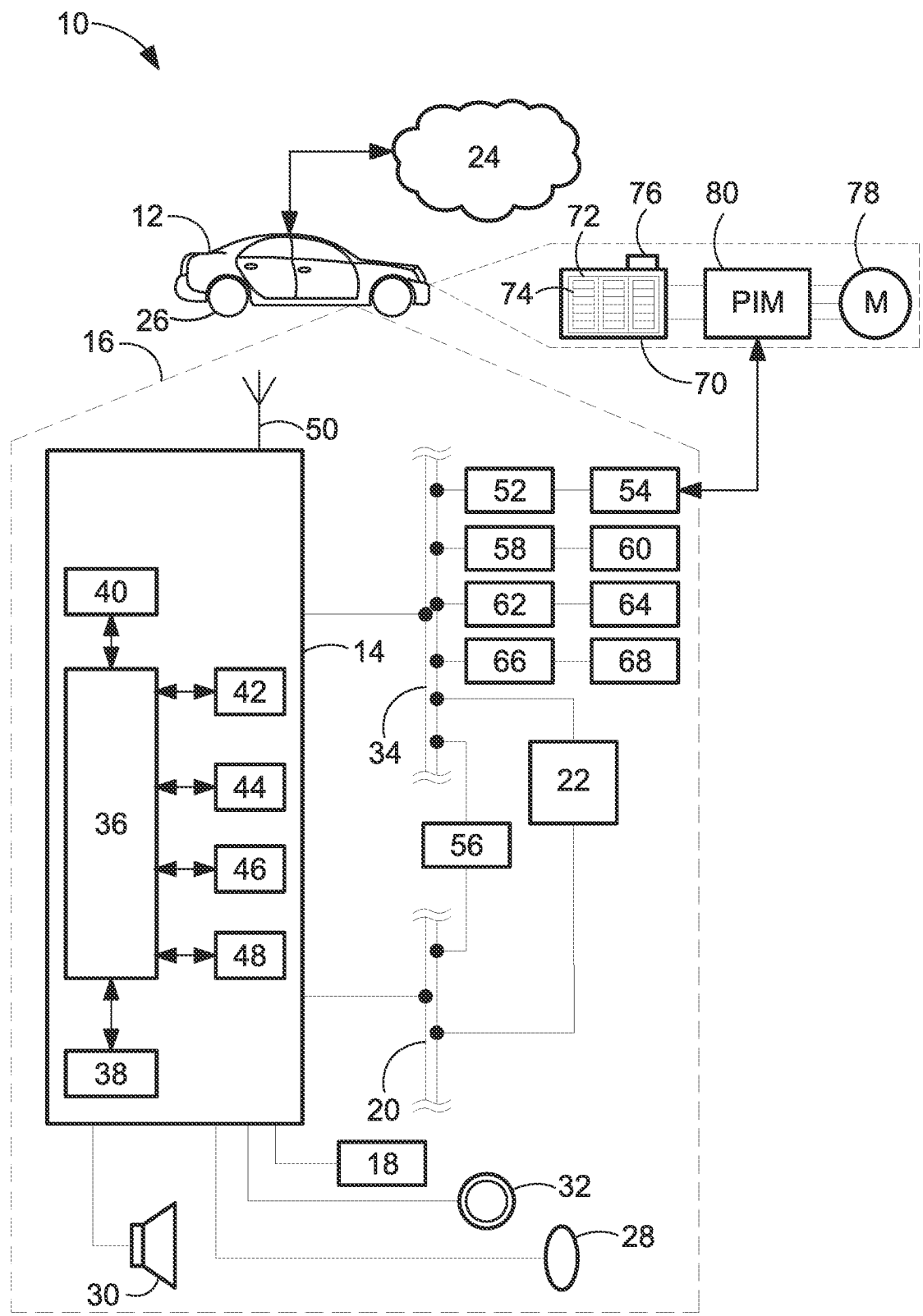
FIG. 1 is a partially schematic side-view illustration of a representative motor vehicle with a network of on-vehicle controllers, sensing devices, and communication devices that provision advanced driving features with enhanced sensor operation for mixed-gradient pathways in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" are to be construed as meaning "one or more" unless expressly disclaimed); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts by the illustrated network of vehicle hardware devices should be appreciated as a non-limiting implementation of disclosed features. As such, it will be understood that aspects and features of this disclosure may be carried out by other vehicle device architectures and may be incorporated into any logically relevant type of vehicle. Moreover, only select components of the motor vehicle and intelligent vehicle system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speaker(s) 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automated vehicle operation.

Digital camera(s) 62 may use a complementary metal oxide semiconductor (CMOS) sensor or other suitable optical sensing device to generate images indicating a field-of-view of the vehicle 10, and may be configured for continuous image generation, e.g., at least about 50+ images per second. By way of comparison, range sensor(s) 64 may emit and detect reflected radio, infrared, light-based, or other electromagnetic signals (e.g., short-range radar, long-range radar, EM inductive sensing, Light Detection and Ranging (LIDAR), etc.) to detect, for example, presence, speed, proximity, etc., of a target object. Vehicle speed sensor(s) 66 may take on various forms, including wheel speed sensors that measure wheel speeds, which are then used to determine real-time host (ego) speed. In addition, the vehicle dynamics sensor(s) 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from these on-vehicle sensing devices, the CPU 36 may identify surrounding driving conditions, determine roadway characteristics and surface conditions, identify target objects within a detectable range of the vehicle, determine attributes of the target object, such as size, relative position, orientation, distance, angle of approach, relative speed, etc., and executes automated control maneuvers based on these executed operations.

These on-vehicle sensing devices may be distributed throughout the motor vehicle 10 in operatively unobstructed positions relative to views fore, aft, port and/or starboard of the vehicle body 12. Each sensor generates electrical signals indicative of a characteristic or condition of the host vehicle or one or more targeted objects, generally as an estimate with a corresponding standard deviation. While the operating characteristics of these sensors are generally complementary, some are more reliable in estimating certain parameters than others. Most sensors have different operating ranges and areas of coverage and are capable of detecting different parameters within their operating range. For instance, a radar-based sensor may estimate range, range rate, and azimuth location of an object, but may not be robust in estimating the shape/extent of a target object. Cameras with optics processing, on the other hand, may be more robust in estimating a shape/size and azimuth position of an object, but may be less efficient at estimating a range and range rate of a target object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for active and continual sensor fusion.

To propel the motor vehicle 10, an electrified powertrain is operable to generate and deliver tractive torque to one or more of the vehicle's drive wheels 26. The powertrain is generally represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organo-silicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains.

The battery pack 70 may be designed such that module management, cell sensing, module-to-module and/or module-to-host communications functionality is integrated directly into each battery module 72 and performed by an integrated electronics package, such as a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., may collectively define a cell module assembly.

During normal operation of the automobile 10 of FIG. 1, which may also be referred to herein as a subject "host" or "ego" vehicle, the vehicle 10 may traverse across a mixed-gradient pathway (e.g., a hilly road, a winding mountain pass, a deeply inclined street, etc.). Prior to, contemporaneous, or after entering an inclined gradient of the pathway, the host vehicle 10 may come upon one or more preceding "headway" vehicles; the closest of these preceding vehicle(s) may be identified and designated as the closest-in-path vehicle (CIPV) target vehicle. While following the CIPV target vehicle across the mixed-gradient pathway, a forward-facing front camera module (FCM) (e.g., digital camera 62 of FIG. 1 or waterproof 1.2 megapixel CMOS HD camera module 62' of FIGS. 3A and 3B) and a forward-facing long-range radar (LRR) package (e.g., range sensor 64 of FIG. 1 or fixed-mount X and K-band pulsed radar array 64' of FIGS. 3A and 3B) may drop the target vehicle (e.g., new data from both sensors indicates target is no longer detected). When exiting the inclined gradient (e.g., cresting a hill), the host vehicle's FCM may report errant position and velocity measurements as the target vehicle is revealed over the local horizon and reacquired by the FCM prior to reacquisition by the LRR. In particular, the distinctive topology of the road and the distinct mounting locations of the host vehicle's sensors may prevent the LRR from picking up the target for a delayed time period. Without remediating measures, the vehicle's ACC and/or CAS control module may generate a false-positive urgent driving scenario in which immediate braking is needed (e.g., collision imminent braking (CIB)).

Presented herein are intelligent vehicle systems with control logic to mitigate sensor limitations on mixed-gradient (hilly) roads by using GPS and/or IMU sensor data to establish when such edge cases are occurring and reactively dampen inaccurate camera sensor data to militate against false braking. During host vehicle operation, the AV/ADAS control module actively monitors for and identifies when the host vehicle is traveling in a hilly environment. Once established, the host vehicle monitors for and localizes the presence of a CIPV target vehicle. If this CIPV target is dropped without changing direction, lane, etc., the host vehicle's ego speed may be kept substantially constant or allowed to controllably increase/decrease to a preset ACC speed for a calculated timeframe. The host vehicle may be allowed to resume open-lane speed upon reaching the position at which the CIPV target was dropped. If a camera-only CIPV target vehicle reappears, the AV/ADAS module may observe the IMU grade signal to extract properties of the road conditions. If the grade is positive and approaching zero, control module may set a flag that the host vehicle is cresting a hill. The calculated distance of the host to the CIPV target and attributes of the grade signal that triggered the flag may establish calibratable bounds for the duration and magnitude of automated driving operation for the host vehicle. The calibratable exit criteria may include camera target distance, target stability, and road grade status. When the above conditions are met, a target suppression flag may be set to prevent false-positive activation of controller-automated braking/steering.

Attendant benefits for at least some of the disclosed concepts may include the ability to compensate for sensor field-of-view (FoV) limitations that are caused by discrete sensor packaging positions and mixed-gradient pathway (hilly road) scenarios. Disclosed features may also help to compensate for inaccurate target object velocity and position data generated by the host vehicle camera sensors. By implementing herein described advanced driving features with enhanced on-vehicle sensor operation for mixed-gradient pathways, the host vehicle is able to militate against errant vehicle response with a concomitant improvement in passenger ride experience. In addition to predicting relevant "hilly road" scenarios to suppress errant vehicle responses, the host vehicle is also able to improve target tracking performance and to help ensure a proper vehicle response to detected-dropped-reacquired CIPV target vehicles.

Figure 2:
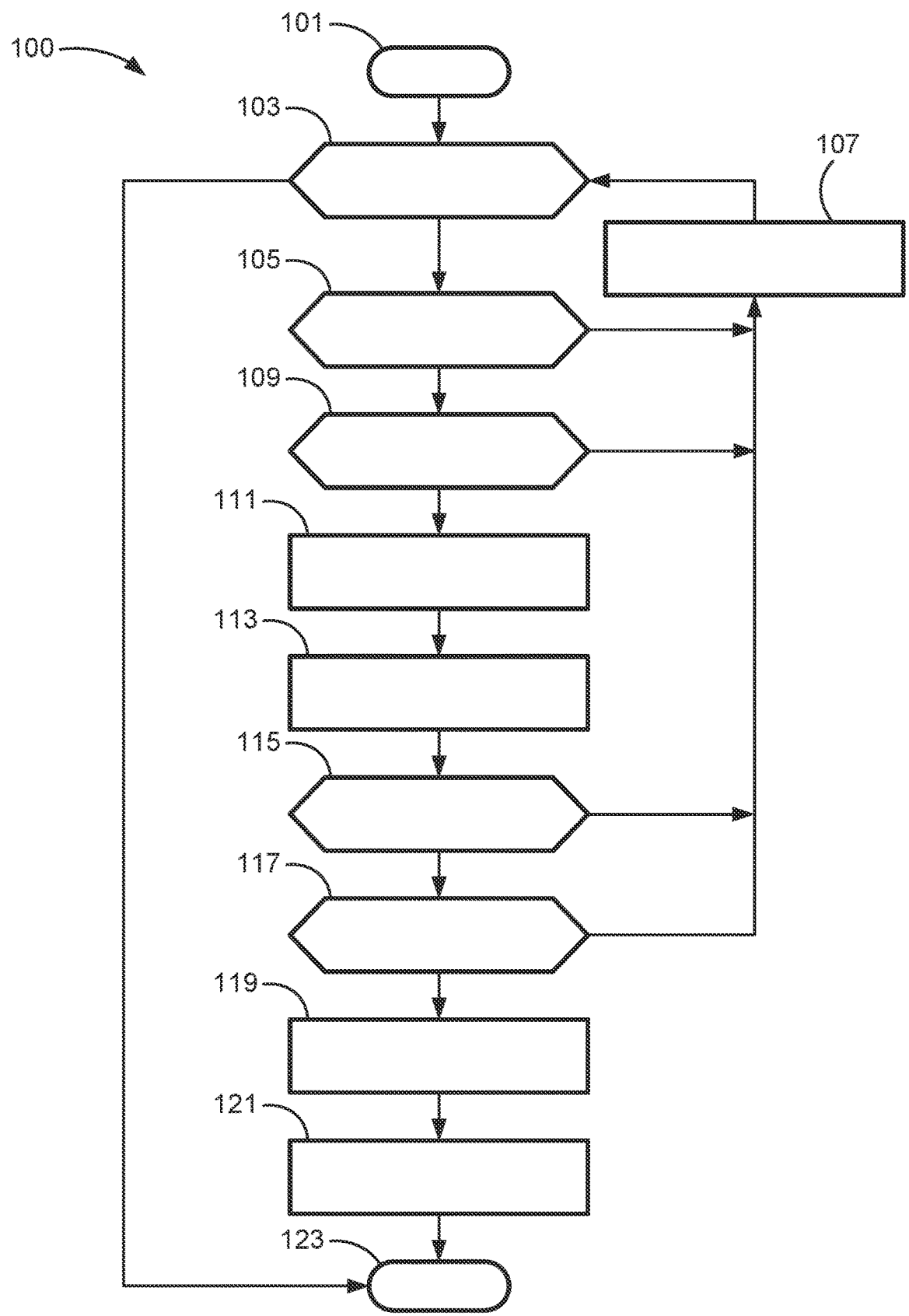
FIG. 2 is a flowchart illustrating a representative vehicle control protocol for provisioning advanced driving features with enhanced sensor operation for mixed-gradient pathways, which may correspond to memory-stored instructions that are executable by a resident or remote microcontroller, control-logic circuit, system control module, or other integrated circuit (IC) device or network of circuits/modules/ microcontrollers/IC devices (collectively "controller") in accord with aspects of the disclosed concepts.
Figure 3A:
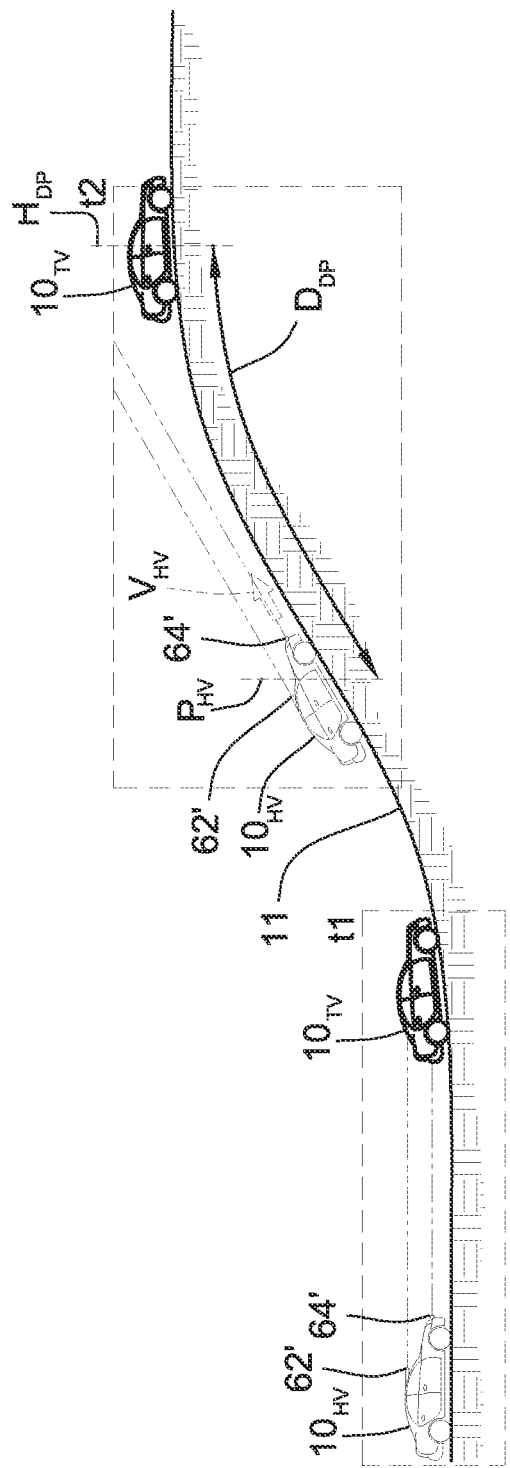
FIGS. 3A and 3B are partially schematic side-view illustrations of a representative host vehicle detecting (t1), then dropping (t2), then reacquiring by camera only (t3), and thereafter reacquiring by fused camera and radar (t4) a target vehicle on a hilly road to mitigate sensor limitations and thereby enhance AV/ADAS driving in accord with aspects of the disclosed concepts.
Figure 3B:
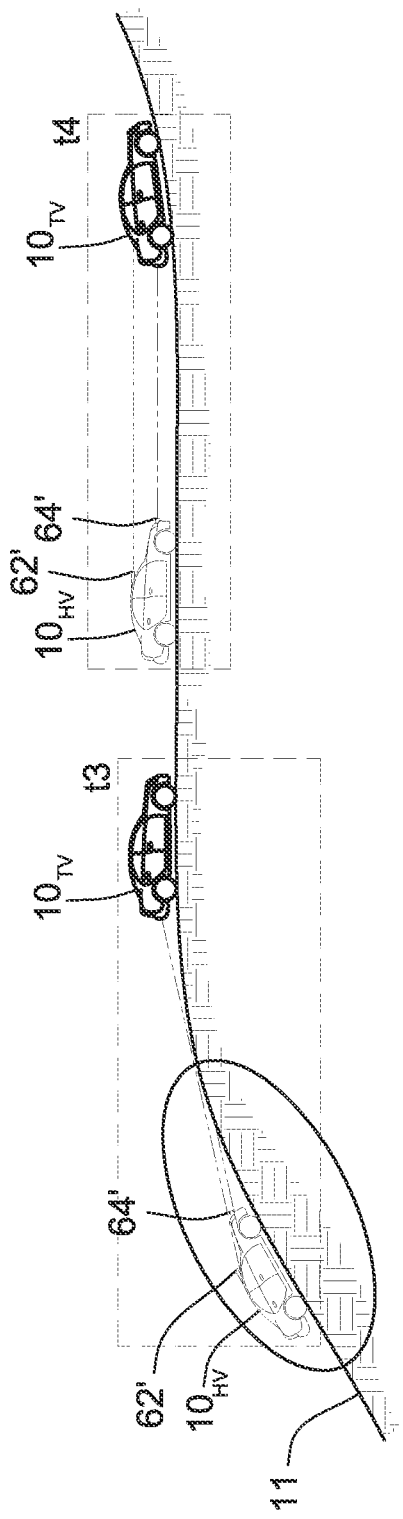

With reference next to the flow chart of FIG. 2, an improved method or control strategy for provisioning advanced controller-automated driving features through enhanced sensor operation for a host vehicle traversing a mixed-gradient pathway, such as vehicle 10 of FIG. 1 or host vehicle $10_{HV}$ of FIGS. 3A and 3B ascending a hilly road 11, is generally described at 100 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., resident memory device 38 and/or remote cloud computing service 24 database of FIG. 1), and executed, for example, by an electronic controller, processing unit, dedicated control module, logic circuit, or other module or device or network of controllers/modules/devices (e.g., CPU 36 and/or processor 40 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 begins at START terminal block 101 of FIG. 2 with memory-stored, processor-executable instructions for initializing a mixed-gradient driving scenario procedure for a subject host vehicle. This routine may be executed in real-time, near real-time, continuously, systematically, and/or at predefined time intervals, for example, each 10 or 100 milliseconds during normal operation of the motor vehicle 10. As yet another option, terminal block 101 may initialize responsive to a user command prompt (e.g., via telematics input controls 32), a resident vehicle controller prompt (e.g., from CPU 36), or a broadcast prompt signal received from a centralized back office (BO) vehicle services system (e.g., from cloud host service 24). By way of non-limiting example, method 100 may automatically initialize during a key-on event in which a driver, owner, occupant, or other authorized operator of the vehicle 10 (collectively "user") powers on the vehicle powertrain and shifts the vehicle into drive. Upon completion of some or all of the control operations presented in FIG. 2, method 100 may advance to END terminal block 123 and temporarily terminate or, optionally, may loop back to terminal block 101 and run in a continuous loop. Terminal block 123 may be automatically triggered in response to the driver shifting into park or a key-off event in which a user powers off the host vehicle 10.

Method 100 advances from terminal block 101 to HILLY ROAD decision block 103 to determine whether or not the host vehicle is currently traversing a mixed-gradient pathway. For instance, the host vehicle's AV/ADAS control module may aggregate sensor-based gradient data output by a resident inertial measurement unit (IMU) to recognize when the host vehicle is ascending a hilly road (e.g., >10-degree grade). The IMU may take on various form factors, such as a 3-axis, 6-axis, or 9-axis construct that is securely mounted inside the host vehicle's body and contains three gyroscopes, three accelerometers and, if desired, three magnetometers. During vehicle operation, the IMU may track the fore-aft pitch angle of the host (ego) vehicle and changes thereof. If an absolute value of a change in the host vehicle's pitch angle is greater than a predefined threshold (e.g., 10 degrees), the AV/ADAS system concludes that the host vehicle is currently on a mixed-gradient road. FIG. 3A illustrates an example in which a host vehicle $10_{HV}$ is approaching a hilly road 11 with an 18-degree incline. Upon determining that the host vehicle is not on a mixed-gradient road (Block 103=NO), method 100 may proceed to terminal block 123 and temporarily end or may return to terminal block 101 and run in a continuous loop.

In response to a determination that the host vehicle is presently crossing a mixed-gradient pathway (Block 103=YES), method 100 may execute TARGET DETECTED decision block 105 to determine whether or not there is a preceding "headway" vehicle forward of the host. A positive determination at block 105 may necessitate at least two of the host vehicle's forward-facing, on-vehicle sensors substantially simultaneously detecting at least one preceding target vehicle after the AV/ADAS control module confirms the host is traversing a mixed-gradient path. At time=t1 of FIG. 3A, for example, the host vehicle's forward-facing monocular camera 62' and long-range radar array 64' concurrently perceive a target vehicle $10_{TV}$ forward of the host vehicle $10_{HV}$ on the hilly road 11. Upon acquisition of the target, the camera 62' and LRR 64' collectively generate real-time target proximity, range, azimuth position, type, size, speed, and other related data for the target vehicle $10_{TV}$. By aggregating, pre-processing, fusing, and evaluating this sensor-generated data, the host vehicle's AV/ADAS module may confirm that the target vehicle $10_{TV}$ is a closest-in-path vehicle and is in a lane shared by the host vehicle $10_{HV}$. Upon determining that there is no leading target vehicle forward of the host vehicle, the target vehicle is not a CIPV target, and/or the target vehicle is in a different lane (Block 105=NO), method 100 may responsively execute DEFAULT OPERATION subroutine block 107 and resume normal AV/ADAS vehicle operation until the host vehicle approaches another mixed-gradient pathway.

With continuing reference to FIG. 2, method 100 may respond to detecting a CIPV target vehicle that shares the same lane as the host (Block 105=YES) by monitoring the target to determine if the host's forward-facing, on-vehicle sensors subsequently drop the target vehicle, as indicated at TARGET DROPPED decision block 109. After the target vehicle $10_{TV}$ is detected at time=t1 of FIG. 3A, for example, the host's AV/ADAS control module may systematically fuse radar and camera-generated data to continuously track the target. At time=t2 of FIG. 3A, the target vehicle $10_{TV}$ has exited the hilly road 11 and "disappeared" from an immediate line of sight of the host vehicle $10^{HV}$. Consequently, the host vehicle's monocular camera 62' and LRR array 64' no longer perceive the target vehicle; new sensor data generated by these two forward-facing sensors will indicate that the CIPV target is no longer detected and, thus, was dropped at t2. Concluding that a CIPV target vehicle is "dropped" by the host vehicle's forward-facing sensors may also demand the AV/ADAS control module aggregate, preprocess, fuse, and analyze available sensor data (e.g., generated by cameras 62, range sensors 64, speed sensors 66, dynamics sensors 68, etc.) to confirm that neither the host nor the target has changed lanes or turned off the pathway substantially coincident with the target vehicle being dropped. Concluding that a CIPV target vehicle is dropped may also necessitate determining that one or more dynamic properties of the target is/are within a predefined, calibratable range (e.g., range rate does not exceed preset threshold). If the CIPV target is not dropped (Block 109=NO), method 100 may responsively loop back through process block 107 to process blocks 103 and 105.

Reacting to a conclusion that the detected CIPV target was dropped by the host (Block 109=YES), method 100 may automatically execute TIME TO DROP subroutine block 111 to predict an estimated travel time for the host vehicle to reach a fixed location at which the target vehicle was dropped. As the AV/ADAS control module of host vehicle $10_{HV}$ continues to track the CIPV target vehicle $10_{TV}$ perceived at time=t1, for example, the target vehicle $10_{TV}$ thereafter abruptly disappears from host vehicle $10_{HV}$ sensor detection at time=t2 (crest of hill 11 occludes sensing of target). When corroborating target drop, the AV/ADAS control module flags the last detected geographic location of the target vehicle $10_{TV}$ within the existing camera/radar-fused target data; this position is temporarily stored in resident cache memory as a headway drop position $H_{DP}$ associated with a corresponding headway distance $D_{DP}$ to the drop position $H_{DP}$. Using the drop position $H_{DP}$ and headway distance $D_{DP}$ (e.g., retrieved from resident vehicle memory 38), the host vehicle's current (real-time) position $P_{HV}$ (e.g., retrieved from GPS transceiver 44), and the host vehicle's current (real-time) speed and heading $V_{HV}$ (e.g., retrieved from vehicle speed and dynamics sensors 66, 68), the AV/ADAS control module calculates an estimated travel time for the host vehicle $10_{HV}$ to reach the drop position $D_{DP}$.

In tandem with subroutine block 111, method 100 may execute EGO SPEED subroutine block 113 to restrict large changes in ego speed until the host reaches the target's drop location. Upon determining that the detected target vehicle $10_{TV}$ was dropped (Block 109=YES), for example, the AV/ADAS control module of host vehicle the $10_{HV}$ may command the host vehicle's powertrain control module (e.g., speed command signal transmitted to PCM 52 of FIG. 1) to maintain a current vehicle speed for at least the estimated time calculated at Block 111, that is until the host vehicle $10_{HV}$ reaches the drop position $D_{DP}$. During a Level 3 ACC driving operation or a Level 4 or Level 5 AV driving operation, the host vehicle's set ego speed may be restricted or locked so that the AV/ADAS control module does not unnecessarily increase/decrease ego speed after target drop. Subroutine block 113 may allow for minor controlled changes in ego speed, such as a slow ramp-up or ramp-down of host vehicle speed to a preset ACC speed, until lapse of the estimated travel time.

Method 100 advances from subroutine block 113 to CIPV CAMERA-ONLY TARGET decision block 115 to determine if the dropped CIPV target is subsequently reacquired and, if so, reacquired by only one or only select ones of the forward-facing, on-vehicle sensors. For instance, the AV/ADAS module of the host vehicle $10_{HV}$ may actively search for the target vehicle $10_{TV}$ after it was dropped by both the monocular camera 62' and LRR array 64' at time=t2 of FIG. 3A. At time=t3 of FIG. 3B, for example, the target vehicle $10_{TV}$ is subsequently reacquired by the host vehicle $10_{HV}$ and is initially only revealed to and detected by the monocular camera 62'; at t3, the target is not revealed to or otherwise detectable by the LRR array 64'. This is due, in part, to the first sensor—digital video camera 62'—being mounted at a distinct (first) height at a distinct (first) location on the host vehicle body (e.g., to the passenger compartment roof structure), whereas the second sensor—LRR array 64'—is mounted at a lower (second) height at a respective (second) location on the vehicle body (e.g., behind the front grill). At this juncture, there may be inaccurate camera reporting for an intermittent time period (e.g., ~1-2 seconds) before stabilization and reacquisition by the LRR array for camera-radar fusion.

For at least some applications, a conclusion that the dropped target has been reacquired may also entail confirming that the host vehicle is traversing the mixed-gradient pathway concurrent with the reacquisition of the target vehicle. On the other hand, decision block 115 may return a negative response if multiple forward-facing, on-vehicle sensors contemporaneously reacquire the dropped CIPV target vehicle. For example, method 100 may loop back to block 103 or exit at terminal block 123 in response to a determination that the target vehicle is reacquired at substantially the same time by both the monocular camera 62' and the LRR array 64'. Upon confirming that the dropped CIPV target was not reacquired by only one or only select ones of the host vehicle's forward-facing, on-vehicle sensors (Block 115=NO), method 100 may responsively loop back through process block 107 to process blocks 103 and 105.

Responsive to a determination that the CIPV was picked up again as a camera-only target while the host is still traversing the road with varying grade (Block 115=YES), method 100 may execute FORWARD WARNING decision block 117 to determine if the target vehicle is at least a predefined minimum distance forward of the host vehicle. With reference again to the example presented at time=t3 of FIG. 3B, the AV/ADAS control module of the host vehicle $10_{HV}$ may actively track the now reacquired target and evaluate sensor-generated target data to ascertain whether or not the target vehicle $10_{TV}$ is within a vehicle-calibratable CIPV dimensional criteria range (e.g., 50-150 meters) forward of the host vehicle $10_{HV}$. If the target vehicle $10_{TV}$ is outside the CIPV dimensional criteria (Block 117=NO), the method 100 may reactively loop to process block 107 and resume default vehicle driving operation. For instance, if the reacquired target is not at least the predefined minimum distance forward of the host (e.g., target relative range of 25 meters), the AV/ADAS control module may command the host vehicle's brake system to immediately execute a braking operation (e.g., transmit brake command signal to immediately activate CIB).

Upon confirming that the headway distance to the newly reacquired CIPV target exceeds the predefined minimum distance (Block 117=YES), method 100 may responsively execute VISR FLAG internal storage block 119 of FIG. 2 and set a flag in resident memory noting that the resultant visual ring (VISR) vehicle data may not be reliable. In tandem with the internal storage block 119, method 100 may also respond to a detected-dropped-reacquired CIPV target vehicle by activating SUPPRESS AV/ADAS RESPONSE subroutine 121 and concomitantly commanding one or more resident subsystems of the host vehicle to suppress one or more automated driving operations of the host vehicle. At time=t3 of FIG. 3B, for example, the AV/ADAS control module may command the host vehicle's brake system to temporarily limit or deny controller-automated brake commands while also commanding the host vehicle's steering system to temporarily limit or deny controller-automated steering changes. In a more specific, yet non-limiting example, the host vehicle $10_{HV}$ may suppress ACC/CAS braking to militate against a false-positive CIB system response.

It may be desirable that subroutine 121 of FIG. 2 suppress a select controller-automated AV/ADAS response or responses for only a limited period of time and/or only under predefined circumstances. By way of example, and not limitation, the command signal(s) output by the AV/ADAS control module to the host vehicle's resident subsystem(s) will suppress the automated driving operation(s): (1) for at least a vehicle-calibratable, predefined suppression timeframe; (2) until the LRR array or other designed forward-facing sensor reacquires the target vehicle after the camera sensor reacquires the target vehicle; and/or (3) until the target vehicle is not at least a predefined minimum distance forward of the host vehicle. For instance, ACC-borne braking may be restricted to maintain ego speed for a suppression timeframe that is determined based on the roads varying grade, the current ego velocity, the current CIPV target velocity, changes in CIPV target velocity, etc. At time=t4 of FIG. 3B, for example, the host vehicle $10_{HV}$ may be allowed to resume default driving operations because the target vehicle $10_{TV}$ is reacquired by both the host vehicle's forward-facing monocular camera 62' and LRR array 64'.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a host vehicle having a vehicle body and forward-facing first and second sensors mounted at first and second locations, respectively, of the vehicle body, the method comprising:
    receiving, via a vehicle controller of the host vehicle, gradient data indicating the host vehicle is traversing a mixed-gradient pathway;
    detecting, via both the first and second sensors after receipt of the gradient data, a target vehicle forward of the host vehicle on the mixed-gradient pathway;
    determining, via the vehicle controller after detection of the target vehicle, if both the first and second sensors dropped the target vehicle;
    determining, via the vehicle controller responsive to determining the target vehicle is dropped, if the target vehicle is reacquired by the first sensor and not the second sensor; and
    transmitting, via the vehicle controller responsive to determining the target vehicle is reacquired by the first sensor and not the second sensor, a command signal to a resident subsystem of the host vehicle to suppress an automated driving operation of the host vehicle.

2. The method of claim 1, further comprising:
    determining, via the vehicle controller responsive to determining the target vehicle is dropped by the first and second sensors, a drop position at which the target vehicle was dropped; and
    determining, via the vehicle controller, an estimated time for the host vehicle to reach the drop position.

3. The method of claim 2, further comprising transmitting, via the vehicle controller to a powertrain control module of the host vehicle, a speed command signal to maintain a current vehicle speed for at least the estimated time.

4. The method of claim 1, wherein determining the target vehicle is reacquired by the first sensor includes confirming, via the vehicle controller, the host vehicle is concurrently traversing the mixed-gradient pathway when the target vehicle is reacquired.

5. The method of claim 1, further comprising:
    determining, via the vehicle controller responsive to determining the target vehicle is reacquired by the first sensor, if the target vehicle is at least a predefined minimum distance forward of the host vehicle,
    wherein transmitting the command signal to the resident subsystem to suppress the automated driving operation is further in response to determining the target vehicle is at least the predefined minimum distance forward of the host vehicle.

6. The method of claim 5, further comprising transmitting, via the vehicle controller responsive to the target vehicle not being at least the predefined minimum distance forward of the host vehicle, a brake command signal to a brake system of the host vehicle to immediately execute a braking operation.

7. The method of claim 1, further comprising not transmitting the command signal to the resident subsystem to suppress the automated driving operation in response to determining the target vehicle is reacquired substantially coincident by both the first and second sensors.

8. The method of claim 1, wherein determining the target vehicle is dropped by both the first and second sensors includes the vehicle controller confirming neither the host vehicle nor the target vehicle has changed lanes substantially coincident with the target vehicle being dropped.

9. The method of claim 1, wherein the command signal causes the resident subsystem to suppress the automated driving operation: (1) for at least a predefined suppression timeframe; (2) until the second sensor reacquires the target vehicle after the first sensor reacquires the target vehicle; and/or (3) until the vehicle controller determines the target vehicle is not at least a predefined minimum distance forward of the host vehicle.

10. The method of claim 1, wherein detecting the target vehicle forward of the host vehicle includes the vehicle controller confirming the target vehicle is a closest-in-path vehicle and is in a lane shared by the host vehicle.

11. The method of claim 1, wherein the gradient data includes real-time sensor data generated by a multi-axis inertial measurement unit (IMU) mounted to the vehicle body and including a gyroscope and an accelerometer.

12. The method of claim 1, wherein the first sensor includes a digital video camera mounted at a first height on the vehicle body, and the second sensor includes a long-range radar array mounted at a second height, lower than the first height, on the vehicle body.

13. The method of claim 1, wherein the mixed-gradient pathway is a hilly road and the gradient data indicates the host vehicle is ascending towards a crest of the hilly road.

14. A non-transient, computer-readable medium storing instructions executable by one or more processors of a vehicle controller of a host vehicle, the host vehicle having a vehicle body and forward-facing first and second sensors mounted at first and second locations, respectively, of the vehicle body, the instructions, when executed by the one or more processors, causing the vehicle controller to perform operations comprising:

receiving gradient data indicating the host vehicle is traversing a mixed-gradient pathway;

determining, responsive to receiving the gradient data, both the first and second sensors detect a target vehicle forward of the host vehicle on the mixed-gradient pathway;

determining, after detection of the target vehicle by the first and second sensors, if both the first and second sensors dropped the target vehicle;

determining, responsive to the target vehicle being dropped by the first and second sensors, if the target vehicle is reacquired by the first sensor and not the second sensor; and transmitting, responsive to determining the target vehicle is reacquired by the first sensor and not the second sensor, a command signal to a resident subsystem of the host vehicle to suppress an automated driving operation of the host vehicle.

15. A motor vehicle, comprising:

a vehicle body;

a plurality of road wheels attached to the vehicle body;

a prime mover attached to the vehicle body and configured to drive one or more of the road wheels to thereby propel the motor vehicle;

a pair of on-vehicle sensors including forward-facing first and second sensors mounted at first and second locations, respectively, of the vehicle body; and a vehicle controller operatively connected to the first and second sensors, the vehicle controller being programmed to:

receive gradient data indicating the motor vehicle is traversing a mixed-gradient pathway;

responsive to receiving the gradient data, determine both the first and second sensors detect a target vehicle forward of the motor vehicle on the mixed-gradient pathway;

after detection of the target vehicle by the first and second sensors, determine if both the first and second sensors dropped the target vehicle;

responsive to the target vehicle being dropped by the first and second sensors, determine if the target vehicle is reacquired by the first sensor and not the second sensor; and responsive to determining the target vehicle is reacquired by the first sensor and not the second sensor, command a resident subsystem of the motor vehicle to suppress an automated driving operation of the motor vehicle, the resident subsystem including a vehicle brake system and/or a vehicle steering system.

16. The motor vehicle of claim 15, wherein the vehicle controller is further programmed to:

responsive to determining the target vehicle is dropped by the first and second sensors, determine a drop position at which the target vehicle was dropped; and determine an estimated time for the motor vehicle to reach the drop position; and command a powertrain control module of the motor vehicle to maintain a current vehicle speed for at least the estimated time.

17. The motor vehicle of claim 15, wherein determining the target vehicle is reacquired by the first sensor includes confirming, via the vehicle controller, the motor vehicle is concurrently traversing the mixed-gradient pathway when the target vehicle is reacquired.

18. The motor vehicle of claim 15, wherein the vehicle controller is further programmed to, responsive to determining the target vehicle is reacquired by the first sensor, determine if the target vehicle is at least a predefined minimum distance forward of the motor vehicle, wherein commanding the resident subsystem to suppress the automated driving operation is further in response to determining the target vehicle is at least the predefined minimum distance forward of the motor vehicle.

19. The motor vehicle of claim 15, wherein the vehicle controller is further programmed to:

determine if the target vehicle is reacquired substantially coincident by both the first and second sensors; and responsive to determining the target vehicle is reacquired substantially coincident by both the first and second sensors, not command the resident subsystem to suppress the automated driving operation.

20. The motor vehicle of claim 15, wherein detecting the target vehicle forward of the motor vehicle includes the vehicle controller confirming the target vehicle is a closest-in-path vehicle and is in a lane shared by the motor vehicle.

* * * * *